(12) United States Patent
Ettes et al.

(10) Patent No.: US 11,949,255 B2
(45) Date of Patent: Apr. 2, 2024

(54) DEVICE AND METHOD FOR WIRELESS POWER TRANSFER

(71) Applicant: KONINKLIJKE PHILIPS N.V., Eindhoven (NL)

(72) Inventors: Wilhelmus Gerardus Maria Ettes, Leeuwarden (NL); Eddy Gerrit Veltman, Steenbergen (NL); Henricus Antonius Gerardus Van Vugt, Heldmond (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/198,858

(22) Filed: May 18, 2023

(65) Prior Publication Data

US 2023/0361627 A1 Nov. 9, 2023

Related U.S. Application Data

(63) Continuation of application No. 17/299,343, filed as application No. PCT/EP2019/083212 on Dec. 2, 2019, now Pat. No. 11,695,303.

(30) Foreign Application Priority Data

Dec. 5, 2018 (EP) ..................................... 18210392

(51) Int. Cl.
*H02J 50/80* (2016.01)
*H02J 50/10* (2016.01)
(Continued)

(52) U.S. Cl.
CPC .............. *H02J 50/80* (2016.02); *H02J 50/10* (2016.02); *H02J 50/60* (2016.02); *H04B 5/0037* (2013.01)

(58) Field of Classification Search
CPC . H02J 50/80; H02J 50/10; H02J 50/60; H04B 5/0037
(Continued)

(56) References Cited

U.S. PATENT DOCUMENTS 10,306,558 B2 5/2019 Kaechi
10,432,029 B2 10/2019 Ikefuji
(Continued)

FOREIGN PATENT DOCUMENTS

WO  2015099065 A1  7/2015
WO  2017153164 A1  9/2017

OTHER PUBLICATIONS

Qi Specification.
International Search Report and Written Opinion From PCT/EP2019/083212 dated Jun. 11, 2020.

*Primary Examiner* — Alfonso Perez Borroto

(57) ABSTRACT

A power transfer device is a power transmitter (201) or a power receiver (205) conducting power transfer using an electromagnetic power transfer signal employing a repeating time frame comprising a power transfer time interval and an object detection time interval. A power transfer circuit (303, 307) comprises a power transfer coil (203, 207) receiving or generating the power transfer signal during the power transfer time intervals. A communicator (315, 323) communicates with the other device via an electromagnetic communication signal. A communication resonance circuit (317, 321) comprises a communication antenna (319, 325) for transmitting or receiving the electromagnetic communication signal. During the communication, the communication resonance circuit (317, 321) provides a resonance at a first resonance frequency to the communicator (315, 323). A controller (333, 335) adapts the communication resonance circuit to not provide the resonance at the first resonance frequency to the communicator during object detection time
(Continued)

intervals. The approach may provide improved detection of resonance objects, such as smart cards (e.g. NFC cards).

23 Claims, 7 Drawing Sheets

(51) Int. Cl.
    *H02J 50/60* (2016.01)
    *H04B 5/00* (2006.01)

(58) Field of Classification Search
    USPC .......................................................... 307/104
    See application file for complete search history.

(56) References Cited

U.S. PATENT DOCUMENTS

| | | | |
|---|---|---|---|
| 11,695,303 B2 * | 7/2023 | Ettes ........................ | H02J 50/10 |
| | | | 307/104 |
| 2011/0025265 A1 * | 2/2011 | Mochida ............. | H02J 7/00034 |
| | | | 320/108 |
| 2017/0070104 A1 * | 3/2017 | Chung .................... | H02J 50/10 |
| 2017/0149286 A1 | 5/2017 | Joye et al. | |
| 2017/0338688 A1 * | 11/2017 | Park .......................... | H02J 7/04 |
| 2018/0227017 A1 * | 8/2018 | Lee ........................ | H04B 5/0037 |
| 2020/0212725 A1 | 7/2020 | Van Wageningen | |
| 2020/0280220 A1 | 9/2020 | Ettes | |

* cited by examiner

DEVICE AND METHOD FOR WIRELESS POWER TRANSFER

CROSS-REFERENCE TO PRIOR APPLICATIONS

This application is a continuation of U.S. patent application Ser. No. 17/299,343 filed Jun. 3, 2021 which is the U.S. National Phase application under 35 U.S.C. § 371 of International Application No. PCT/EP2019/083212, filed on Dec. 2, 2019, which claims the benefit of EP Patent Application No. EP 18210392.9, filed on Dec. 5, 2018. These applications are hereby incorporated by reference herein.

FIELD OF THE INVENTION

The invention relates to wireless power transfer and in particular, but not exclusively, to high power level power transfer, such as for example for supporting kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In order to support efficient wireless power transfer, wireless power transfer systems, such as Qi based systems, utilize substantial communication between the power transmitter and the power receiver. Initially, Qi supported only communication from the power receiver to the power transmitter using load modulation of the power transfer signal. However, developments of the standard have introduced bidirectional communication and many functions are supported by communication exchanges between the power receiver and the power transmitter. In many systems, the communication from the power transmitter to the power receiver is accomplished by modulating the power transfer signal. However, it has also been proposed to use communication functionality which is independent of the power transfer signal and which does not use the power transfer signal as a carrier being modulated. For example, the communication between power transmitter and power receiver may be achieved by a short range communication system such as RFID/NFC communication approaches.

Using a separate communication approach may in many situations provide improved performance and may e.g. provide faster communication with a higher communication reliability and a reduced impact on the ongoing power transfer.

In power transfer systems, such as Qi, the electromagnetic field generated to transfer the required levels of power to the power receiver is often very substantial. The presence of such a strong field may in many situations have an impact on the surroundings. For example, a potential problem with wireless power transfer is that power may unintentionally be transferred to e.g. metallic objects that happen to be in the vicinity of the power transmitter.

In order to reduce the risk of such scenarios arising, it has been proposed to introduce foreign object detection where the power transmitter can detect the presence of a foreign object and reduce the transmitted power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification.

A particular issue has been identified as being the detection of Smart Cards and similar items, such as e.g. NFC cards.

A contactless smart card is typically a small device for contactless communication using electromagnetic coupling between a tuned antenna of a reader and a resonance circuit of a receiver. In many situations, the smart card is a passive device powered by the signal induced in the resonance circuit. This allows cheap cards to be produced and used with a range of readers. Often a smart card is used as a contactless credential and tend to be credit-card sized.

Typically, an embedded integrated circuit (chip) can store (and sometimes process) data and communicate with a reader via a suitable protocol/standard, such as specifically using Near Field Communication (NFC). Commonplace uses include transit tickets, bank cards and passports.

As illustrated by the example of FIG. 1, an NFC smart card 101 may electrically typically comprise an antenna coil L, a tuning capacitor C, a rectifier 103 and an NFC chip 105 powered by the signal extracted by the resonance circuit formed by the capacitor C and the coil L. In most cases the parallel resonance of a smart card is tuned to a resonance frequency of 13.56 MHz.

FIG. 1 also illustrates a simplified model of an NFC reader 107 for reading the data stored in the smart card. An NFC reader typically comprises an NFC reader chip 109 and an NFC antenna 111 which is also tuned at a resonance frequency of 13.56 MHz. If the smart card 101 is brought into the proximity of the NFC reader 107, the antenna coil L is exposed to the 13.56 MHz magnetic field from the NFC reader 107 and the NFC chip 105 powers up via the Vcc pin. Once powered up, the NFC chip 105 in the smart card is able to modulate its own Vcc by means of load modulation thereby sending data back to the NFC reader 107. The time between powering up of the NFC chip in the smart card and the sending of information back to the NFC Reader is typically in the range of about 30-50 mSec.

Detection of such cards has been found to be particularly important due to them being very popular and almost ubiquitous in many typical usage environments for wireless power transfer (e.g. in homes) and due to the sensitivity of such cards to the presence of strong electromagnetic fields. Indeed, it has been found that the electromagnetic field strength employed in many wireless power transfer systems, such as specifically for higher power level transfers, in many scenarios may potentially damage the cards. It has been found that smart cards may be damaged if exposed to a strong AC magnetic field, even if the frequency of that field is very different from the resonance frequency of 13.56 MHz. If for instance a strong AC magnetic field in the order of 20-200 kHz is exposed to the antenna coil L of FIG. 1, the rectified voltage Vcc might become too high and destroy the NFC chip 101. Furthermore, the time required to damage the card may be much shorter than 30-50 mSec (of course depending of the level of the AC magnetic field to which the smart card is exposed). This means that the NFC chip inside the smart card can be destroyed by a strong AC magnetic field.

It has at the same time been found to be particularly difficult to detect such cards using conventional foreign object detection approaches since they typically contain relatively small amounts of metal. This makes it very challenging to get a sufficiently high accuracy and reliability of the detection.

In order to address this problem, it has been proposed to introduce detectors specifically aimed at detecting the presence of smart cards and similar devices. These smart card detectors are typically based on detecting the presence of a resonance circuit having resonance frequencies matching the expected resonance for a smart card.

Such dedicated detection has been found to provide improved detection performance allowing smart card detection in many scenarios. However, it has been found that the reliability and accuracy of detection of smart cards in practice tend to be lower than preferred resulting in potentially missed detections or false positive detections.

Hence, an improved power transfer approach would be advantageous, in particular, an approach allowing increased flexibility, reduced cost, reduced complexity, improved communication, improved power transfer operation, improved object detection performance, a more reliable and/or secure power transfer operation, reduced risk to other objects such as specifically to smart cards and similar, improved accuracy and/or reliability and/or accuracy in detecting foreign objects such as smart cards or similar, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transfer device for wireless power transfer from a power transmitter to a power receiver using an electromagnetic power transfer signal, the power transfer device being one of the power transmitter and the power receiver, and the power transfer signal during a power transfer phase employing a repeating time frame comprising a power transfer time interval and an object detection time interval being non-overlapping with the power transfer time interval, a power limit of the power transfer signal being lower for the object detection time interval than for the power transfer time interval, the power transfer device comprising: a power transfer circuit comprising a power transfer coil for receiving or generating the power transfer signal during the power transfer time intervals; a communicator for communicating with a complementary device being the other device of the power receiver and the power transmitter via an electromagnetic communication signal; a communication resonance circuit comprising a communication antenna for transmitting or receiving the electromagnetic communication signal, the communication resonance circuit during communication being arranged to provide a resonance at a first resonance frequency to the communicator; and a controller for adapting the communication resonance circuit to not provide the resonance at the first resonance frequency to the communicator during object detection time intervals.

The invention may allow improved operation in many embodiments and may especially allow improved, faster, and/or facilitated detection of, in particular, objects exhibiting resonances to electromagnetic fields at frequencies close to the first resonance frequency, where the detection may be performed by the power transfer device or the complementary power transfer device. The power transmitter may perform object detection based on an assumption of the object comprising a resonance around the first resonance frequency (e.g. within 5 or 10%). The approach may allow for this detection to be improved, e.g. allowing the detection to be performed in short time intervals and/or with higher accuracy and reliability.

The approach may in particular provide an operation that reduces the interference that a communication circuit may provide to a resonance based object detection function which is based on an assumption of a resonance corresponding to (close to or the same as) the communication resonance frequency/the first resonance frequency.

The approach may in particular allow improved detection of foreign smart cards, such as NFC smart cards, in a wireless power transfer system which utilizes corresponding communication, e.g. NFC communication between the power receiver and the power transmitter.

In many embodiments, a duration of the object detection time interval is no more than 5%, 10%, or 20% of the duration of the repeating time frame. In many embodiments, the duration of the power transfer interval is no less than 70%, 80%, or 90% of the time frame.

In many embodiments, the repeating time frame may further include at least one communication time interval. The communication time interval may be non-overlapping with the power transfer time interval and the object detection time interval. During a communication time interval, the power level of the power transfer signal may be subject to a lower maximum limit than during the power transfer time interval. In many embodiments, the power transfer signal may have a low power level during communication time intervals and object detection time intervals, and a high power level during power transfer time intervals.

In many embodiments, the repeating time frame may be a periodic repeating time frame. In many embodiments, each repeating time frame may have a duration of no more than 0.5 second, 1 second, 2 seconds, or 5 seconds.

The timing of the object detection time intervals and/or the power transfer time intervals may be independent of the power transfer properties, data exchange between the power transmitter and the power receiver, object detections, power requests, and power transfer requirements. The timing of the object detection time intervals may be predetermined within a repeating time frame and/or may be the same in consecutive repeating time frames. The relative timing of an object detection time interval within a repeating time frame may be unchanged between consecutive repeating time frames, and may be fixed. The timing of object detection time intervals within the repeating time frames may be constant (for at least some consecutive time frames). In many embodiments, a time frame may be divided into a plurality of time intervals including at least one power transfer time interval and one object detection time interval. The timing of the time intervals within the repeating time frame (e.g. relative to a start or end time of the repeating time frame) may be the same for consecutive time frames.

The power receiver may be present and request power throughout the power transfer phase. The power receiver may be detected/determined to be present (by the power transmitter) throughout the power transfer phase.

In many embodiments, the controller may control the communication resonance circuit to have a resonance at the first resonance frequency during communication, and specifically during communication time intervals, and to not have a resonance at the first resonance frequency during the object detection time intervals.

In accordance with an optional feature of the invention, the controller is arranged to decouple the communication resonance circuit from the communicator during object detection time intervals.

In accordance with an optional feature of the invention, the controller is arranged to detune the communication resonance circuit from the first resonance frequency during object detection time intervals.

In accordance with an optional feature of the invention, the controller is arranged to detune the communication resonance circuit to a second resonance frequency during the object detection time intervals.

In accordance with an optional feature of the invention, the second frequency is outside a frequency range from 90% of the first resonance frequency to 110% of the first resonance frequency.

In accordance with an optional feature of the invention, the controller is arranged to change a resonance capacitance of the communication resonance circuit during the object detection time interval relative to during communication.

The above additional features may provide improved performance and/or facilitated implementation in many embodiments. The detuning of the communication resonance circuit may correspond to modifying the resonance circuit to resonate at a different frequency or may correspond to modifying the resonance circuit to no longer have a resonance (corresponding to deactivating the resonance circuit).

In accordance with an optional feature of the invention, the first resonance frequency deviates by no more than 5% from a carrier frequency of the electromagnetic communication signal.

This may provide improved performance in many embodiments. In typical embodiments, the first resonance frequency may be substantially identical to the frequency of the electromagnetic communication signal thereby allowing optimized communication. However, in practice the first resonance frequency may differ slightly from the communication frequency e.g. due to imperfect tuning resulting from component variances and tolerances.

In accordance with an optional feature of the invention, the power transfer device is the power transmitter.

The invention may provide an improved power transmitter.

In accordance with an optional feature of the invention, the power transfer device further comprises an object detector for detecting a presence of an object comprising a resonance circuit having a resonance frequency corresponding to the first resonance frequency.

The invention may allow improved detection of devices/ objects comprising resonance circuits, such as for example NFC cards, by a power transmitter. The object may comprise a resonance circuit having a resonance frequency assumed to be within 5% of the first resonance frequency.

In many embodiments, the power transfer device may comprise an object detector for detecting a presence of an object in response to a loading of an electromagnetic test signal generated by the object detector, the electromagnetic test signal having a frequency corresponding to the first resonance frequency. The electromagnetic test signal may have a frequency equal to the first resonance frequency, or may typically be within 2 or 5% of the first resonance frequency. The electromagnetic test signal may in some embodiments be generated by a different antenna/coil than the communication antenna. The electromagnetic test signal may in some embodiments be generated by the communication antenna, which may be a communication coil. The electromagnetic test signal may in some embodiments be generated by a different antenna/coil than the power transfer coil.

In many embodiments, the power transfer device may comprise an object detector for detecting a presence of an object comprising a resonance circuit having a resonance frequency meeting a similarity criterion with respect to the first resonance frequency.

In many embodiments, the power transfer device may comprise an object detector for detecting a presence of an object in response to a loading of generated electromagnetic test signal having a frequency deviating by less than a threshold, say of 1%, from the first resonance frequency.

In some embodiments, the detection may be dependent on the resonance of the loading of the power transfer signal meeting a similarity criterion with respect to the first resonance frequency. The similarity criterion may be explicitly evaluated or may e.g. be implicit by a search for a resonance frequency being limited to an interval comprising the first resonance frequency.

A similarity criterion may depend on the preferences and requirements of the individual embodiment. The similarity criterion may include a requirement that a detected resonance frequency of the object and the first resonance frequency differ by less than a threshold.

In accordance with an optional feature of the invention, the controller is arranged to decouple the communication resonance circuit from the communicator and to couple it to the object detector during object detection time intervals.

This may allow particularly efficient performance and especially improved detection performance. It may further reduce complexity and e.g. component requirements thereby reducing cost etc.

In accordance with an optional feature of the invention, the power transfer device is the power receiver.

The invention may provide an improved power transmitter.

In accordance with an optional feature of the invention, the power transfer device further comprises a synchronizer for synchronizing the controller to level variations of the power transfer signal.

This may provide efficient, yet low complexity, performance.

In accordance with an optional feature of the invention, there is provided a wireless power transfer system comprising a power receiver and power transmitter as described above.

The invention may provide an improved wireless power transfer system.

According to an aspect of the invention there is provided a method of operation for a power transfer device for wireless power transfer from a power transmitter to a power receiver using an electromagnetic power transfer signal, the power transfer device being one of the power transmitter and the power receiver, and the power transfer signal during a power transfer phase employing a repeating time frame comprising a power transfer time interval and an object detection time interval being non-overlapping with the power transfer time interval, a power limit of the power transfer signal being lower for the object detection time interval than for the power transfer time interval, the power transfer device comprising a communication resonance circuit comprising a communication antenna for transmitting or receiving the electromagnetic communication signal, the method comprising: a power transfer circuit comprising a power transfer coil receiving or generating the power transfer signal during the power transfer time intervals; communicating with a complementary device being the other device of the power receiver and the power transmitter via an electromagnetic communication signal; controlling the communication resonance circuit being arranged to provide a resonance at a first resonance frequency to the communicator during communication; and adapting the communication resonance circuit to not provide the resonance at the first resonance frequency to the communicator during object detection time intervals.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 2:
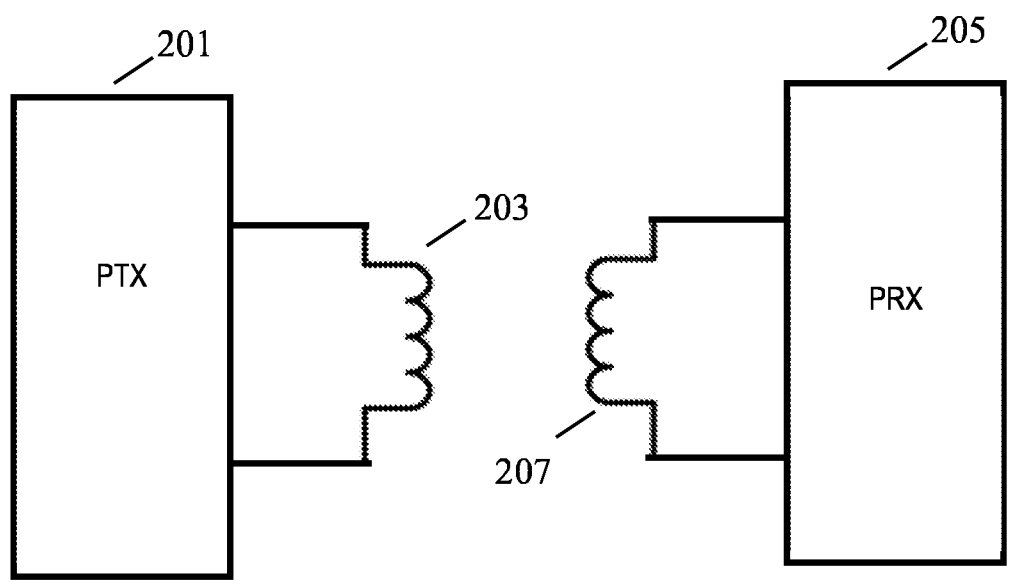
FIG. 2 illustrates an example of elements of a power transfer system in accordance with some embodiments of the invention.

FIG. 2 illustrates an example of a power transfer system in accordance with some embodiments of the invention. The power transfer system comprises a power transmitter 201 which includes (or is coupled to) a transmitter coil/inductor 203. The system further comprises a power receiver 205 which includes (or is coupled to) a receiver coil/inductor 207.

The system provides an electromagnetic power transfer signal which may inductively transfer power from the power transmitter 201 to the power receiver 205. Specifically, the power transmitter 201 generates an electromagnetic signal, which is propagated as a magnetic flux by the transmitter coil or inductor 203. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 203 and the power receiving coil 207 are loosely coupled and thus the power receiving coil 207 picks up (at least part of) the power transfer signal from the power transmitter 201. Thus, the power is transferred from the power transmitter 201 to the power receiver 205 via a wireless inductive coupling from the transmitter coil 203 to the power receiving coil 207. The term power transfer signal is mainly used to refer to the inductive signal/magnetic field between the transmitter coil 203 and the power receiving coil 207 (the magnetic flux signal), but it will be appreciated that by equivalence it may also be considered and used as a reference to an electrical signal provided to the transmitter coil 203 or picked up by the power receiving coil 207.

In the example, the power receiver 205 is specifically a power receiver that receives power via the receiver coil 207. However, in other embodiments, the power receiver 205 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 2400 W for very high power applications, such as e.g. kitchen applications.

In the following, the operation of the power transmitter 201 and the power receiver 205 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 201 and the power receiver 205 may follow, or substantially be compatible with, elements of the Qi Specification version 1.0, 1.1 or 1.2 (except for the herein described (or consequential) modifications and enhancements).

In wireless power transfer systems, the presence of an object (typically a conductive element extracting power from the power transfer signal and not being part of the power transmitter 201 or the power receiver 205, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi include functionality for foreign object detection. Specifically, the power transmitter comprises functionality seeking to detect whether a foreign object is present. If so, the power transmitter may e.g. terminate the power transfer or reduce the maximum amount of power that can be transferred.

Current approaches proposed by the Qi Specifications are based on detecting a power loss (by comparing the transmitted and the reported received power) or detecting degradations in the quality Q of the output resonance circuit.

Figure 3:
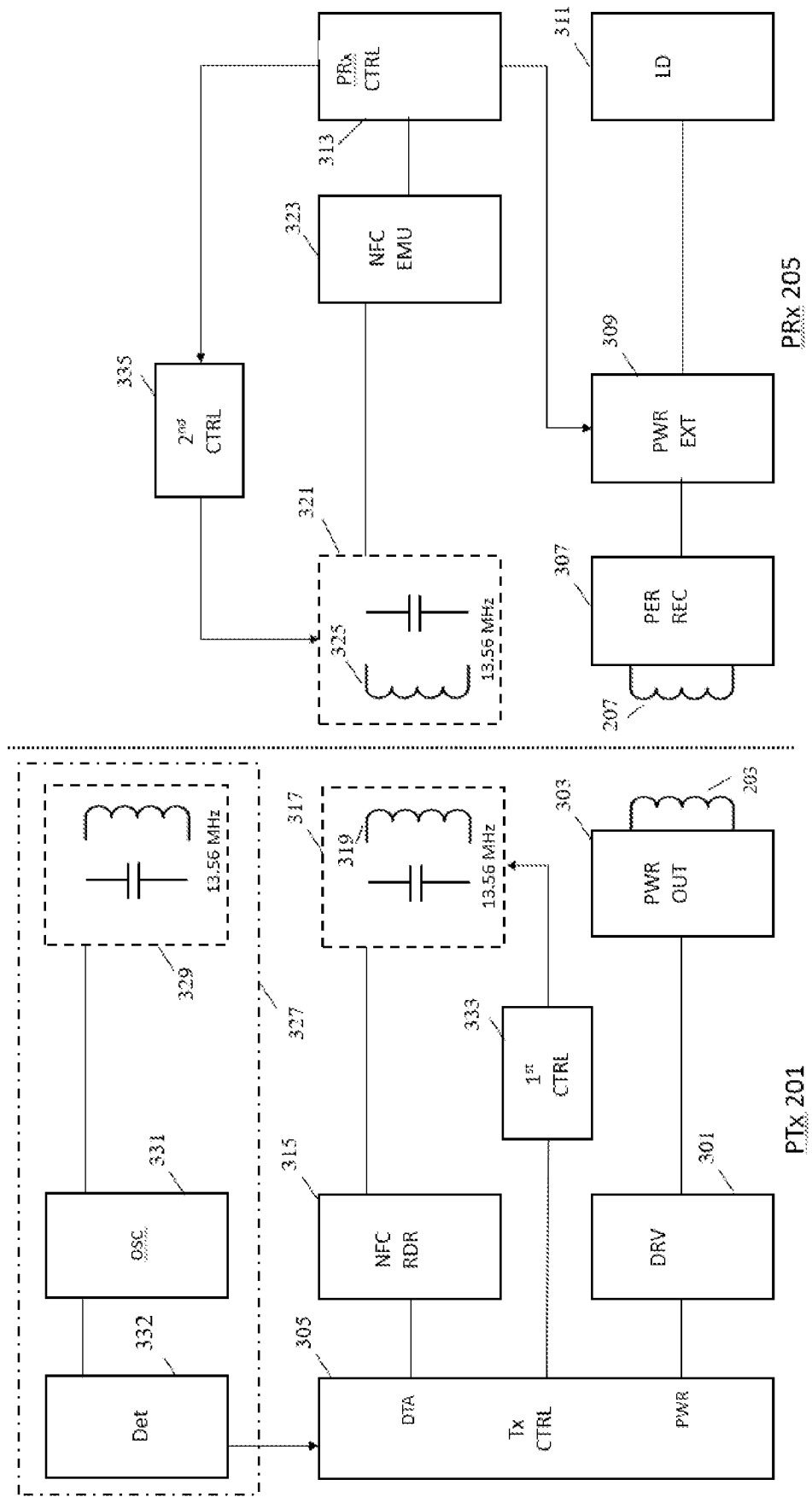
FIG. 3 illustrates an example of elements of a power transfer system in accordance with some embodiments of the invention.

FIG. 3 illustrates the power transfer system of FIG. 2 in more detail.

In the example, the power transmitter 201 includes a driver 301 which can generate a drive signal that is fed to a power resonance circuit 303 which includes the transmitter coil 203. The transmitter coil 203 generates the electromagnetic power transfer signal, which can provide a power transfer to the power receiver 205. The power transfer signal is provided during power transfer time intervals of the power transfer phase.

The driver 301 may typically comprise an output circuit in the form of an inverter, typically formed by driving a full or half bridge as will be well known to the skilled person.

The power transmitter 201 further comprises a power transmitter controller 305 which is arranged to control the operation of the power transmitter 201 in accordance with the desired operating principles. Specifically, the power transmitter 201 may include many of the functionalities required to perform power control in accordance with the Qi Specifications.

The power transmitter controller 305 is in particular arranged to control the generation of the drive signal by the driver 301, and it can specifically control the power level of the drive signal, and accordingly the level of the generated power transfer signal. The power transmitter controller 305 comprises a power loop controller controlling a power level of the power transfer signal in response to the power control messages received from the power receiver 205 during the power control phase.

The receiver coil 207 is part of a power receiver circuit 307 which may typically comprise one or more capacitors forming a resonance circuit with the receiver coil 207. During power transfer, a current is induced in the receiver coil 207 and the power receiver circuit 307 in this way extracts power from the power transfer signal. The signal is coupled to a power converter or power extractor 309 which is arranged to process and control the extracted power and feed this to a load 311. The power extractor 309 may typically include rectifiers, voltage or current controllers etc. which will be well known to the skilled person. The power extractor 309 may provide a power control path which converts the power extracted by the receiver coil 207 into a suitable supply for a load 311, such as e.g. a battery being charged, or a device being powered.

The power receiver further comprises a power receiver controller 313 which may include various power receiver controller functionality required to perform power transfer, and in particular functions required to perform power transfer in accordance with the Qi specifications.

The power transmitter 201 and the power receiver 205 further include means for communicating with each other. In the example, the communication is not (or at least not exclusively) achieved by modulating and demodulating the power transfer signal but rather a separate short-range communication system is used. The short-range communication system may typically have a range of no more than 1 meter, and often no more than 50 cm or even 20 cm. The short-range communication system typically uses a carrier frequency substantially higher than a frequency and typically at least 10 times higher than the carrier frequency of the power transfer signal. In many embodiments, the carrier frequency is at least 1 MHz, and often at least 10 MHz.

In the specific example, the power receiver 205 and the power transmitter 201 communicate using an NFC communication approach. In some embodiments, only some of the communication will be via the NFC communication system whereas other communication may be by other means, e.g. using the power transfer signal as a communication carrier. For example, the NFC communication approach may be used to read power receiver specific parameters using the NFC communication while using e.g. load modulation of the power transfer signal to communicate power control error messages etc.

In the example, the power transmitter 201 comprises a first communicator 315 which is arranged to communicate with the power receiver 205 via an electromagnetic communication signal.

The first communicator 315 is coupled to a first communication resonance circuit 317 which comprises a first communication antenna 319 that generates the electromagnetic communication signal. The first communicator 315 may specifically generate a communication drive signal which is fed to the first communication resonance circuit 317. The first communication resonance circuit 317 is a load for the first communicator 315 and it provides a resonance at a given first resonance frequency. Typically, the first communication resonance circuit 317 comprises a tuned circuit which includes the first communication antenna 319. For example, the first communication antenna 319 may be a coil which is coupled with one or more capacitors to form a resonance/tuned circuit.

The resonance circuit is typically tuned to the carrier frequency of the electromagnetic communication signal resulting in the first communication resonance circuit 317 providing a very efficient antenna for the first communicator 315. In practice, there may be some discrepancy between the first resonance frequency and the carrier frequency e.g. due to component tolerances and variations, the presence of conductive material etc. However, typically it is possible to keep the first resonance frequency within 5%, and often within 1%, of the carrier frequency.

Correspondingly, the power receiver 205 comprises a second communication resonance circuit 321 which is coupled to a second communicator 323. The second communication resonance circuit 321 is complementary to the first communication resonance circuit 317 and correspondingly comprises a communication antenna (referred to as the second communication antenna 325). The second communication antenna 325 is arranged to receive the electromagnetic communication signal in that a current is induced in the second communication antenna 325.

The second communication resonance circuit 321 is coupled to the second communicator 323 and provides an impedance with a resonance at a given second resonance frequency. The second communication resonance circuit 321 accordingly provides a source with an impedance/load to the second communicator 323 which has a resonance at a given second resonance frequency. Typically, the second communication resonance circuit 321 comprises a tuned circuit which includes the second communication antenna 325. For example, the second communication antenna 325 may be a coil which is coupled with one or more capacitors to form a resonance/tuned circuit.

The resonance circuit is typically tuned to the carrier frequency of the electromagnetic communication signal and to the first resonance frequency resulting in the second communication resonance circuit 321 providing a very efficient antenna. In practice, there may be some discrepancies between the frequencies e.g. due to component tolerances and variations, the presence of conductive material etc. However, typically it is possible to keep the second resonance frequency within 5%, and often within 1%, of the carrier frequency and/or the first resonance frequency.

In the example, the short-range communication uses load modulation to communicate from the power receiver 205 to the power transmitter 201. The first communicator 315 generates a drive signal for the first communication resonance circuit 317 resulting in the electromagnetic communication signal being generated. The second communicator 323 varies the load of the second communication resonance circuit 321 dependent on the data to be communicated to the power transmitter 201. This load variation results in variations in the drive signal (e.g. current variations) which can be detected by the first communicator 315.

The short-range communication may specifically use an NFC approach with the first communicator 315/first communication resonance circuit 317 implementing the functionality corresponding to an NFC reader and the second communicator 323/second communication resonance circuit 321 implementing the functionality corresponding to an NFC card or tag. Thus, the power receiver 205 may effectively emulate an NFC card thereby allowing it to be read by the NFC reader function of the power transmitter 201.

In many embodiments, such as those using the NFC approach, the carrier frequency is (nominally) 13.56 MHz and thus the first and second resonance frequencies are (close to) 13.56 MHz.

In order to detect the presence of unexpected metallic (conductive) elements, such as keys or coins, being heated by being exposed to a large magnetic field, typical power transmitters tend to include foreign object detection functionality specifically aimed at detecting whether any undesired conductive elements are likely to be present within the generated electromagnetic field. Such foreign object detection is conventionally based on evaluating the quality factor of the power resonance frequency or unaccounted for power loss for the power transfer signal. However, whereas this may provide acceptable performance in many scenarios and for many types of objects, it has been found that there is a particular problem with smart cards, such as NFC or RFID cards, as these tend to comprise only small amounts of metal which is difficult to detect reliably.

This tends to be a problem in practice as such cards are susceptible to be damaged by a strong magnetic field. For example, an NFC card may be damaged by a strong electromagnetic field with frequency in the range between of 20-200 kHz despite being arranged to use a carrier frequency of 13.56 MHz. For example, a strong magnetic field may result in a rectified voltage Vcc which may be so high that it destroys the NFC chip. Such damage may occur even after very short exposure to the magnetic field, such as e.g. after only 10-20 msec.

To prevent that such smart cards are damaged by a strong magnetic field generated by the power transmitter, it has been proposed for power transmitters to comprise a so-called Smart Card Detection (SCD) system aimed directly at detecting such cards. More generally, some power transmitters include a resonance device detection circuit that is arranged to detect the presence of a resonance circuit at a given frequency (or close to that, i.e. within a suitable frequency range). Such a resonance detection function may specifically perform a detection which is based on specific parameters of the device being detected, such as specifically be aimed at detecting the presence of a resonance frequency having a given resonance frequency. The resonance device detection circuit may specifically be arranged to generate a test signal that will be particularly affected by the presence of a resonance circuit with the expected parameters, and specifically with the expected resonance frequency.

As a specific example, a test signal may be generated with a frequency corresponding to the nominal resonance frequency. For example, a test drive signal with a frequency corresponding to the nominal frequency may be fed to a resonance circuit tuned to the nominal resonance frequency and with a coil arranged to operate as an antenna. If a device with a resonance circuit tuned to (or close to) the nominal resonance frequency is brought into the proximity of the detection circuit, it will have a strong impact on the detection resonance circuit and this can be detected, e.g. as changes in the current of the drive signal.

Such an approach may allow a detection of the presence of a device comprising such a resonance circuit even in situations where conventional power loss or Q factor foreign object detection approaches are not useful due to requiring a relatively high amount of metal to be present for detection. For example, it allows detection of e.g. smart cards such as NFC cards.

This has a large practical impact as smart cards may be damaged by being exposed to a strong AC magnetic field, even at a significantly different frequency. This is in particular an issue for higher power level wireless power transfer applications, such as those being developed for kitchen applications where e.g. a kettle or pan may be powered. In those systems, it may be necessary for a detection system for smart cards which is highly sensitive.

The power transmitter 201 of FIG. 3 comprises an object detector in the form of a resonance device detector 327 which is arranged to detect the presence of a resonance circuit (having a nominal/predetermined resonance frequency (e.g. which can be assumed to be within a given frequency range comprising a nominal resonance frequency that the resonance device detector 327 is aimed at detecting), and thus a device comprising such a resonance circuit.

In the example, the resonance device detector 327 comprises a detection resonance circuit 329 which is tuned to the nominal detection resonance frequency. In the example, the resonance device detector 327 is a smart card detector arranged to detect e.g. NFC cards and accordingly it is tuned to (around) 13.56 MHz. The detection resonance circuit 329 is coupled to a driver/oscillator 331 which is arranged to generate a carrier signal which has a frequency of the nominal detection resonance frequency. Thus, the oscillator in the specific example generates a 13.56 MHz drive signal and feeds it to the detection resonance circuit 329.

The resonance device detector 327 further comprises a detection processor 332 which is coupled to the oscillator 331. The detection processor 332 is arranged to evaluate a parameter of the drive signal, such as for example the drive current. If the drive parameter deviates from that expected in the case of no smart card being present, the detection processor 332 proceeds to determine that a smart card is potentially present. If so, this detection result is fed to the power transmitter controller 301 which proceeds to take appropriate action, e.g. it may terminate a power transfer or reduce the maximum power level.

The detection processor 332 may specifically be arranged to detect the presence of an object that has a resonance frequency corresponding to that of the detection resonance circuit 329 (and that of the first communication resonance circuit 317), i.e. corresponding to the first resonance frequency. The object detector may detect a presence of an object comprising a resonance circuit having a resonance frequency corresponding to the resonance frequency of the first communication resonance circuit 317 by determining a coil current for a resonance circuit (the detection resonance circuit 329) that has the same resonance frequency and/or using a drive signal having the same resonance frequency. The object detector/resonance device detector 327 may be arranged to detect a presence of an object comprising a resonance circuit having a resonance frequency corresponding to the first resonance frequency by determining a loading of a generated electromagnetic test signal having a frequency deviating from the first resonance frequency by less than a threshold (the threshold may typically be e.g. 0.1%, 0.5%, 1%, 5%, or 10% of the first resonance frequency). Typically the generated electromagnetic signal has a frequency substantially equal to the first resonance frequency. In the example of FIG. 3, the oscillator 331 is arranged to generate a drive signal for the detection resonance circuit 329 such that the electromagnetic (object detection) test signal is generated. The drive signal is specifically generated to have a frequency substantially equal to the first resonance frequency.

In order to provide improved detection, the power transfer signal during the power transfer phase employs a repeating time frame which comprises at least one power transfer time interval and at least one object detection time interval with these time intervals being non-overlapping. During the power transfer time intervals, the power transmitter 201 transfers power to the power receiver 205 by generating a power transfer signal that has the required power level necessary to provide the required power to the power receiver 205. Specifically, the power level during the power transfer time intervals is set in response to the power control messages received from the power receiver 205.

The repeating time frame is typically a periodic repeating time frame. In many embodiments, each repeating time frame may have a duration of no more than 0.5 second, 1 second, 2 seconds, or 5 seconds. The repeating time frame may specifically be a periodically repeating time frame with a period of no more than 0.5 second, 1 second, 2 seconds, or 5 seconds.

During the object detection time intervals, the power level is typically reduced substantially respectively to during the power transfer time intervals. Specifically, the maximum power limit during the object detection time intervals is lower than during the power transfer time intervals and typically to a much lower level. For example, during the object detection time intervals, the maximum power level may be restricted to a limit which is less than 0.5 W, 1 W, 5 W, or 10 W. The power limit during the power transfer signal may typically be at least 5, 10, 50, or a 100 times higher. Thus, the electromagnetic field of the power transfer signal is substantially lower during the power transfer time intervals than during the object detection time intervals.

In many embodiments, the power level may be set to a fixed power level during the object detection time intervals, and specifically it may in some embodiments be set to substantially zero, i.e. the power transfer signal may be switched off. An advantage of such an approach is that the electromagnetic field of the power transfer signal during the object detection time intervals is not only very low but also constant and predictable.

Figure 4:
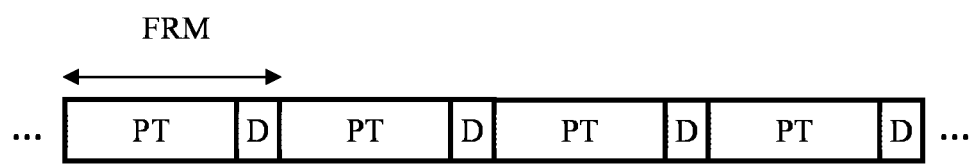
FIG. 4 illustrates an example of a repeating time frame for a power transfer signal for a power transfer system in accordance with some embodiments of the invention.

An example of a repeating time frame is illustrated in FIG. 4 where power transfer time intervals are indicated by PT and object detection time intervals are indicated by D. In the example, each time frame FRM comprises only one object detection time interval and one power transfer time interval and these (as well as the time frame itself) have the same duration in each frame. However, it will be appreciated that in other embodiments, other time intervals may also be included in a time frame (such as e.g. communication intervals) or a plurality of object detection time intervals and/or power transfer time intervals may be included in each time frame. Furthermore, the duration of the different time intervals (and indeed the time frame itself) may in some embodiments vary dynamically.

The repeating time frame may in many embodiments be an invariant, fixed, constant, or even predetermined time frame. In many embodiments, the duration of each time frame may be constant (at least for some consecutive time frames) and the timing of the object detection time intervals within the time frames may be invariant, fixed, constant, or even predetermined. In many embodiments, such as in the example of FIG. 4, the individual time frames are identical. The timing of the repeating time frame, and typically of the object detection time intervals and/or the power transfer time intervals is fixed and constant.

In the system, the power transmitter is thus arranged to perform power transfer during the power transfer time interval of the time frames of the power transfer phase. Specifically, during these time intervals, the power transmitter 201 and the power receiver 205 may operate a power control loop (the power control loop may be based on communication within the power transfer signal time interval or may e.g. be based on communication outside of the power transfer signal time interval, such as in dedicated communication time intervals. For example, each foreign object time interval may be separated by a plurality of alternating power transfer signal time intervals and communication time intervals). Thus, the level of the power being transferred may be dynamically varied.

In some embodiments, the power receiver 205 may also be arranged to reduce the load of the power transfer signal during the object detection time intervals. For example, it may disconnect or decouple a load to reduce the power extracted from the power transfer signal during the object detection time intervals.

In the approach, the object detection by the resonance device detector 327 and the power transfer is thus separated in the time domain thereby resulting in reduced cross-interference from the power transfer to the object/card detection. Thus, the interference caused by the power transfer signal to the resonance card/smart card detection is reduced. Further, the variability and uncertainty resulting from variations in the operating conditions for the power transfer can be isolated from the object detection resulting in a more reliable and accurate detection performance.

Figure 1:
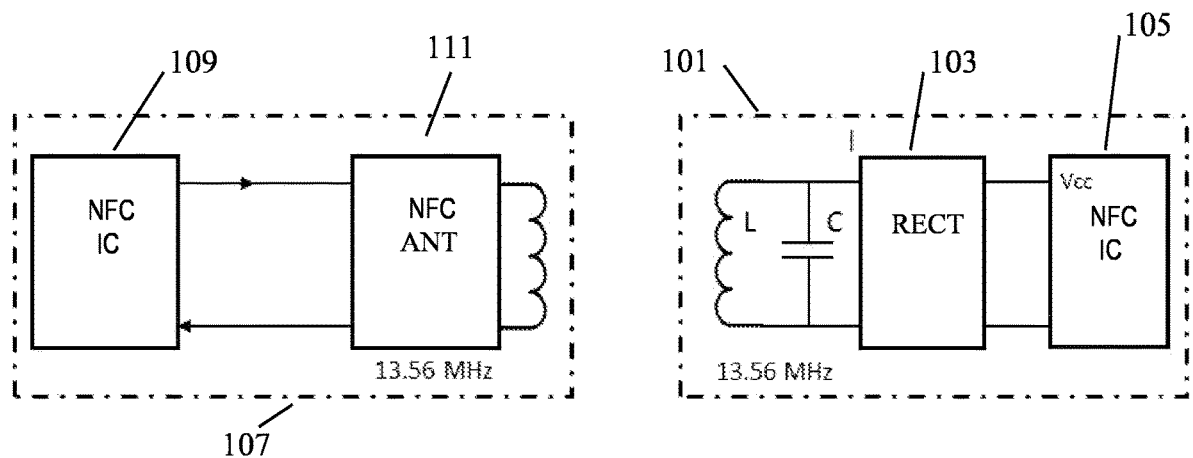
FIG. 1 illustrates an example of elements of an NFC reader and an NFC card.

However, the Inventors have realized that despite this approach, detection of resonance devices tend to not be as accurate as desired in many scenarios. They have further realized that the detection performance can be improved by controlling the operation of the communication circuitry, and specifically by controlling the first communication resonance circuit 317 and/or the second communication resonance circuit 321. In the system of FIG. 1, the power transmitter 201 and/or the power receiver 205 comprises means for adapting their communication resonance circuit such that it provides a resonance at a first resonance frequency during communication but does not provide this resonance at the first resonance frequency during the object detection time intervals.

Specifically, the power transmitter 201 comprises a first controller 333 which is arranged to control the first communication resonance circuit 317 such that the first communication resonance circuit 317 provides the first resonance frequency during times when the short-range communication system is used for communication with the power receiver 205 but not during the object detection time intervals.

The communication using the short-range communication system is performed outside of the object detection time intervals. Thus, the first communicator 315 and the second communicator 323 are arranged to perform the communication outside of the object detection time intervals. The timing of the repeating time frame may be controlled by the power transmitter controller 305 and a timing signal may be fed to the first communicator 315 to control when the communication occurs. In some embodiments, the repeating time frame may include dedicated communication time intervals being non-overlapping with the power transfer time intervals and the object detection time intervals, and specifically the power level of the power transfer signal may be reduced during such communication time intervals (corresponding to the approach for the object detection time intervals). In other embodiments, communication by the first communicator using the first communication resonance circuit 317 may be performed simultaneously with the power transfer, i.e. during the power transfer time intervals.

During communication by the first communicator 315 (specifically during communication time intervals whether overlapping or non-overlapping with the power transfer time intervals), the first controller 333 controls the first communication resonance circuit 317 to provide the resonance at the first resonance frequency and thus allows for optimized communication. However, during the object detection time intervals, the first controller 333 controls the first communication resonance circuit 317 to not provide this resonance frequency. This may be achieved in different ways.

In some embodiments, the first communication resonance circuit 317 may be detuned to change the resonance frequency during the object detection time intervals. Thus, the first controller 333 may control the first communication resonance circuit 317 to change the first communication resonance circuit 317 such that it has a different resonance frequency, referred to as the modified resonance frequency, during the object detection time intervals than during the communication time intervals.

The resonance frequency may for example be changed by switching in (or out) an additional resonance component, such as for example a capacitor forming part of the resonance circuit. For example, during the object detection time intervals, the first controller 333 may control the first communication resonance circuit 317 to switch in an additional capacitor which changes the effective resonance capacitance of the resonance circuit thereby changing the resonance frequency.

The resonance frequency will typically be changed relatively substantially, and in most embodiments will be changed such that the modified resonance frequency is substantially different than the first. In most embodiments, the modified resonance frequency is outside a range from 90% of the first resonance frequency to 110% of the first resonance frequency. This will tend to result in a significantly reduced impact of the first communication resonance circuit 317 on the object detections by the resonance device detector 327. In some embodiments, the deviation may be no less than 20%, 50% or even 100%.

In some embodiments, the first controller 333 may be arranged to control the first communication resonance circuit 317 to not provide a resonance to the first communicator 315 during the object detection time intervals. This may be achieved e.g. by modifying the first communication resonance circuit 317 to not have any resonance or by decoupling/disconnecting the first communication resonance circuit 317 from the first communicator 315.

In the former case, the first communication resonance circuit 317 may for example comprise a switch which disconnects the first communication antenna from the rest of the resonance circuit it is part of, or e.g. by disconnecting the resonance capacitor(s) from the resonance circuit. This will effectively change the circuit to not form a resonance circuit during the object detection time intervals. The switch may then be controlled by the first controller 333.

In such embodiments, the first communication resonance circuit 317 may thus still oscillate at the first resonance circuit but it will be decoupled from the first communicator 205. In many such embodiments, the power transmitter 201 may further be arranged to couple the power receiver circuit 307 to the resonance device detector 327 during the object detection time intervals.

Figure 5:
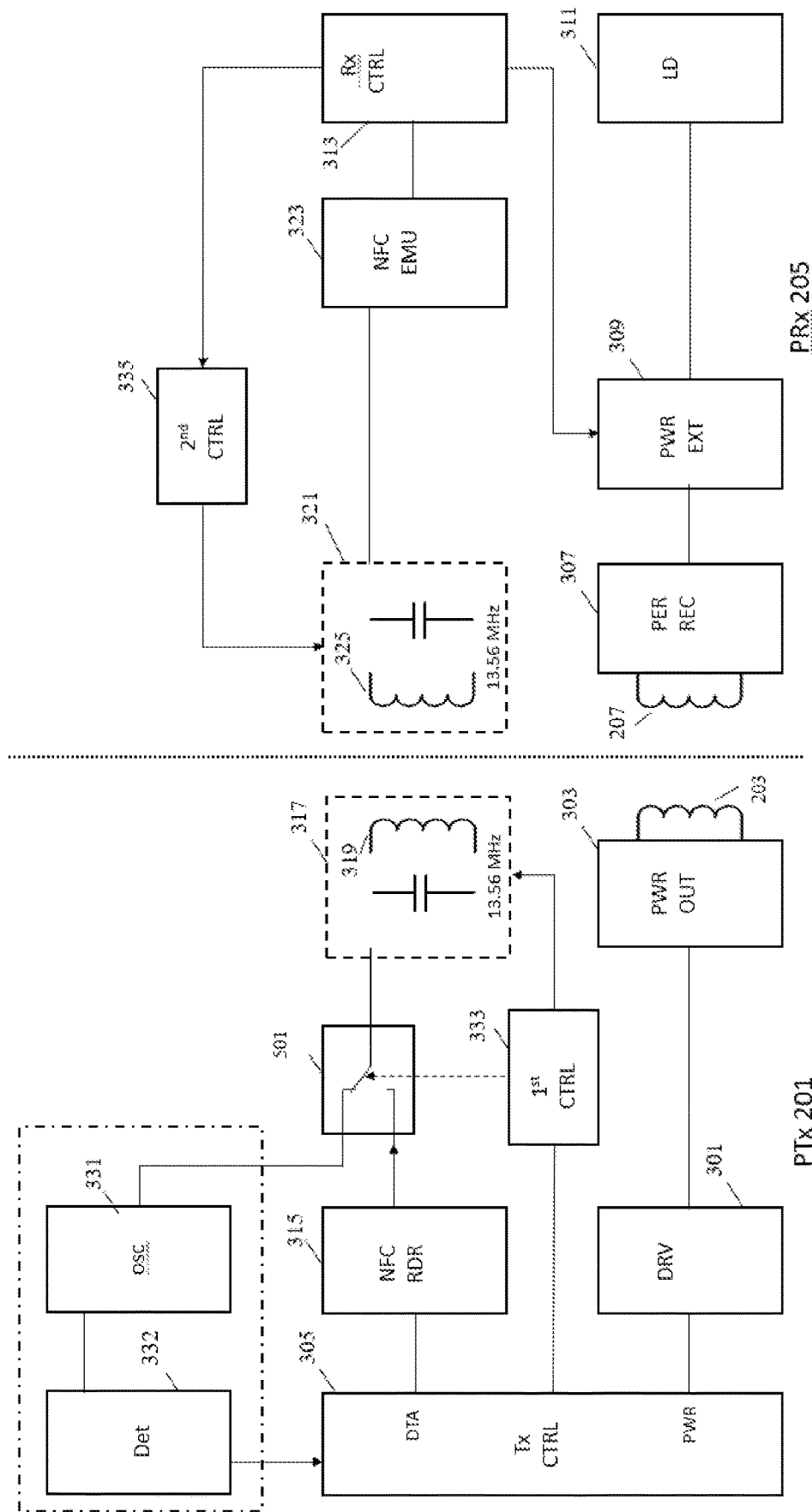
FIG. 5 illustrates an example of elements of a power transfer system in accordance with some embodiments of the invention.

For example, as illustrated in FIG. 5, the power transmitter 201 may comprise an additional switch 501 which switches the first communication resonance circuit 317 from being coupled to the first communicator 205 to being coupled to the resonance device detector 327, and specifically to the oscillator 331. The switch is controlled by the first controller 333 and is arranged to switch such that it couples the first communication resonance circuit 317 to the first communicator 315 during communication (e.g. during communication time intervals of the repeating time frame) and such that it couples the first communication resonance circuit 317 to the resonance device detector 327 during the object detection time intervals.

Such an approach may provide particularly efficient operation as it allows for circuitry to be reused between very different functions thereby allowing reduced cost, complexity, size etc.

The Inventors have realized that the approaches of modifying or removing the resonance frequency of the communication functionality when performing object detection for a resonance device or card may provide improved resonance device detection as it removes or reduces the interference between the communication function and the detection functions. This is particularly for many practical embodiments wherein the communication uses a frequency corresponding to the resonance frequency the resonance device detector 327 is seeking to detect. For example, it is particularly advantageous when trying to detect NFC cards in wireless power transfer systems that use an NFC approach for communication between the power receiver and the power transmitter.

In many embodiments, the tuned communication antenna can be made "invisible" to the object detection circuit, and especially in some embodiments this can be achieved by combining the object detection and communication antennas/coils into an integrated system.

The detection and communication performances are improved by the application of a time division approach where these functions are performed at different times. However, the Inventors have realized that this in itself often does not achieve optimal detection performance in practice. They have realized that the removal of the resonance frequency for the communication circuitry during resonance object/device detection can substantially improve detection performance.

Practical experiments for Qi type systems have shown that using time division between communication and detection may provide improved performance but that it is still not as reliable as desired. It may specifically require quite long detection intervals in order to achieve sufficiently reliable detection performance. In many such systems, the detection time may in practice be in the order of 30-40 msec whereas the described approach may reduce this to around 0.2-2.0 msec. This is particularly advantageous and significant in many embodiments as it brings the detection time in line with that typically required for non-resonance object detections, such as specifically conventional foreign object detection based on power loss or Q-factor measurements. This in particular allows these operations to be performed simultaneously and specifically means the object detection time intervals may be used simultaneously both for resonance device detection and for foreign object detection based on detection of conductive material/metal.

In some embodiments, the power transmitter 201 may also comprise a non-resonance foreign object detector arranged to perform foreign object detection during the object detection time intervals. The non-resonance foreign object detector may be arranged to perform power loss and/or quality factor foreign object detection. The foreign object detection may be a detection of the presence of a conductive element, such as the presence of metal.

In many embodiments the power receiver 205 may alternatively or additionally also be arranged to modify the resonance operation of the second communication resonance circuit 321 during the object detection time intervals relative to when communication is being performed.

The power receiver 205 comprises a second controller 335 which is arranged to control the second communication resonance circuit 321. The second communication resonance circuit 321 may operate correspondingly to the first communicator 205 and may specifically control the second communication resonance circuit 321 to change its resonance frequency or to completely prevent resonance during the object detection time intervals.

The comments and descriptions previously provided with respect to the first communication resonance circuit 317 and the first controller 333 apply mutatis mutandis to the second communication resonance circuit 321 and the second controller 335.

Thus, the second controller 335 may be arranged to control the second communication resonance circuit 321 to switch in or out a resonance component such as a series or parallel second capacitor thereby changing the resonance frequency. In other embodiments, the second controller 335 may control the second communication resonance circuit 321 to disconnect the second communication antenna 325 from the corresponding resonance capacitor thereby preventing resonance.

Whereas the power transmitter 201 generates the power transfer signal and thus inherently has knowledge of the timing of the repeating time frame employed, the power receiver 205 may not have this information available. Therefore, in many embodiments, the power receiver 205 may comprise functionality for synchronizing the operation of the second controller 335 to the repeating time frame of the power transfer signal.

The power receiver controller 313 may for example synchronize the second controller 335 to level variations (variations in the level) of the power transfer signal. The power level of the induced signal is during the power transfer time intervals typically much higher than during the object detection time intervals. Therefore, a power level transition can be detected between the time intervals and this can be used to synchronize a local time base to the power transfer signal, and thus can be used to synchronize the switching of the second communication resonance circuit 321 to the repeating time frame of the power transfer signal.

In some embodiments, during the object detection time intervals, the power transmitter 201 has reduced power of the power transfer signal to a level where the power receiver 205 receives substantially no power. The power transmitted by the power transmitter 201 will in this case mainly be absorbed by a foreign object in proximity of the power transmitter 201. This can be measured with a much higher accuracy because the uncertainty of the power transferred towards the power receiver 205 is not in the equation anymore. Therefore, improved non-resonance based foreign object detection can be achieved. In addition, improved resonance based object detection (by the resonance device detector 327) can be achieved as the interference caused by the power transfer signal is also reduced at the substantially different frequency of the resonance (e.g. 13.56 MHz). Further, by removing the resonance of the second communication resonance circuit 321 (and the first communication resonance circuit 317), the interference of the communication circuitry is reduced.

Figure 6:
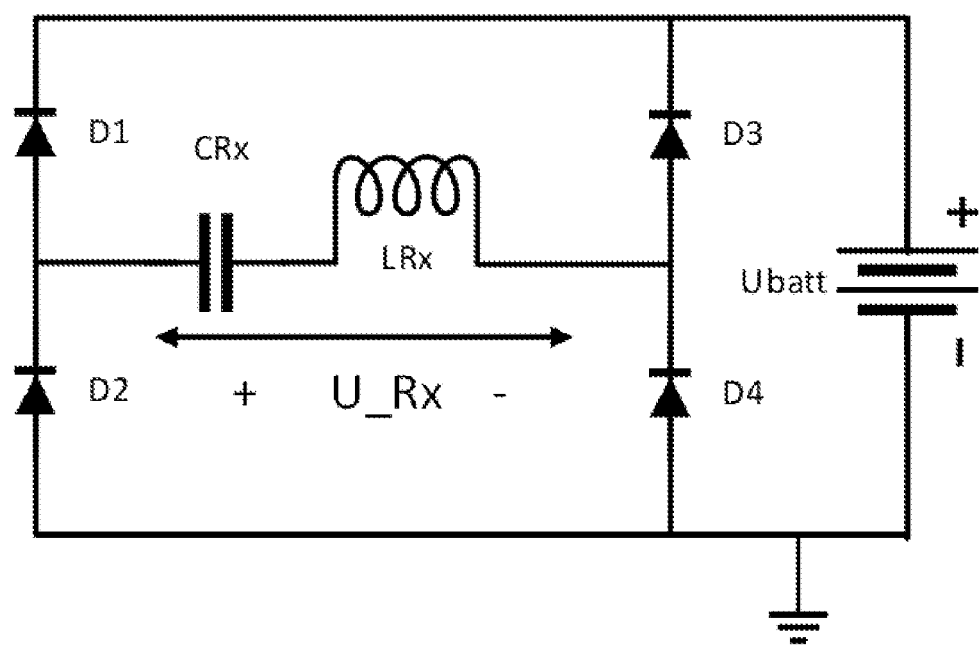
FIG. 6 illustrates an example of elements of a power receiver for a power transfer system in accordance with some embodiments of the invention.

As an example, if the load of the power receiver 205 is a battery with a certain battery voltage Ubatt as exemplified in FIG. 6, power transfer to the power receiver 205 can effectively be disconnected by reducing the power signal/magnetic field generated by the power transmitter 201. This is the case when the induced voltage U_Rx at the input of the receiver's rectifier is lower than the battery voltage Ubatt. In that case the diodes D1 to D4 of the rectifier bridge do not conduct and no current flows to the battery (the load). The diodes act like a passive disconnection switch. Although the power transmitter 201 has reduced the transferred power during the object detection time interval, the drive signal for switching the second communication resonance circuit 321 (i.e. the timing signal representing the repeating time frame) can easily be derived from the induced voltage U_Rx by means of amplitude demodulation.

Figure 7:
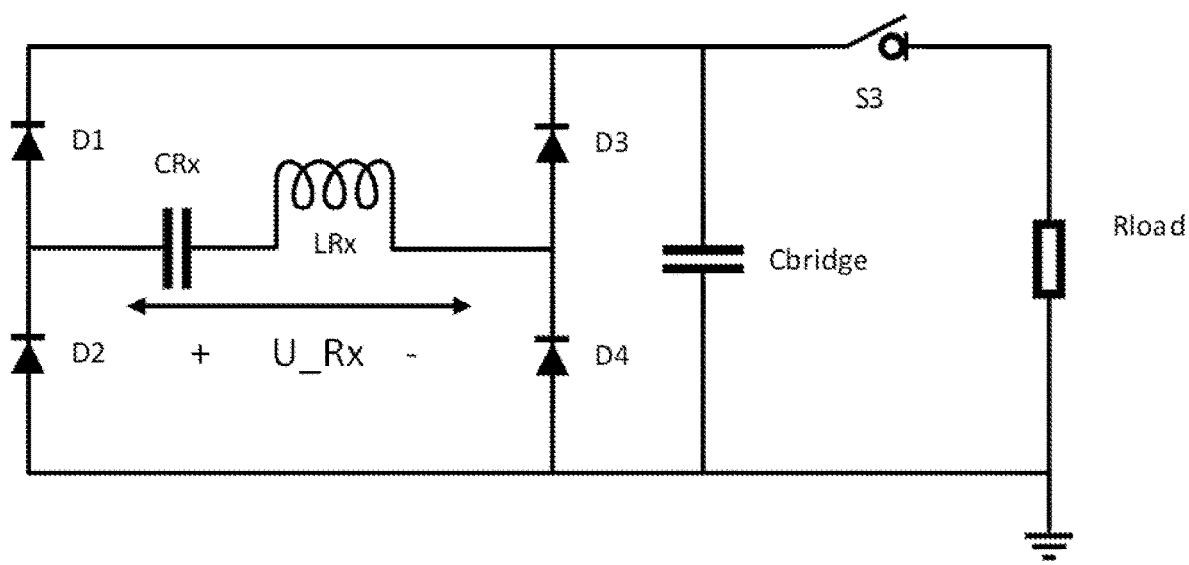
FIG. 7 illustrates an example of elements of a power receiver for a power transfer system in accordance with some embodiments of the invention.

As another example which is illustrated in FIG. 7, if the load of the power receiver 205 is not a battery but an e.g. a resistive load, the disconnection of the load will not take place automatically by the power level being reduced. The diodes D1 to D4 of the rectifier bridge will stay in conduction mode. With switch S3 the diodes D1 to D4 can be brought in non-conduction mode in order to effectively disconnect the load Rload. The drive signal for switching the second communication resonance circuit 321 can again be derived from the induced voltage U_Rx by means of amplitude demodulation.

In many embodiments, the exact timing of the switching of the operation of the first communication resonance circuit 317 and the second communication resonance circuit 321 is not critical. In many embodiments, the first controller 333 and the second controller 335 may be arranged to switch the first communication resonance circuit 317 and second communication resonance circuit 321 to not provide resonance at the first frequency with a suitable time margin before the start of an object detection time interval and with a suitable time margin after the end of an object detection time interval. Thus, no resonance at the first resonance frequency is present during the object detection time intervals.

Similarly, the first controller 333 and the second controller 335 may switch the first communication resonance circuit 317/second communication resonance circuit 321 to the first resonance frequency prior to starting any communication and may not switch away until after communication.

In many embodiments, a repeating time frame may comprise both an object detection time interval and a communication time interval with power transfer intervals in-between. In such an embodiment, the first controller 333/second controller 335 may in principle perform the switching at any time during the power transfer intervals. As these are typically very long compared to both the communication time intervals and the object detection time intervals, it tends to not provide strict timing requirements and allow even relatively low accuracy synchronization to be sufficient. However, in many embodiments, it is desirable to maximize the time in which the resonance circuits have a resonance at the first resonance frequency and therefore switching may in many embodiments be performed shortly before (or even upon entering) the object detection time interval and shortly after (or even upon exiting) the object detection time interval. This may allow the first communicator 315 to provide a communication carrier during most of the repeating time frame which may be useful in embodiments wherein some functionality of the power receiver (e.g. the second communicator) are powered by energy extracted from the communication signal.

Although the previous description has focused on the detection of smart cards, it will be appreciated that it may be used for detection of other objects, and specifically of other resonance devices having a resonance with respect to a magnetic field in which the device is present.

It will also be appreciated that in many embodiments both the power transmitter and the power receiver will switch the resonance frequency of the communication resonance circuits but that in some embodiments only one of the power transmitter and the power receiver may apply this approach. This may still provide improved detection and reduce the interference between the communication function and the detection function.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter device comprising:
   a power transfer circuit,
      wherein the power transfer circuit comprises a power transfer coil,
      wherein the power transfer coil is arranged to generate a power transfer signal during at least one power transfer interval(s),
      wherein the at least one power transfer interval(s) is a portion of at least one repeating frame(s),
      wherein the at least one repeating frame(s) comprises the at least one power transfer interval(s), at least one object detection interval(s) and at least one communication interval(s);
   a communicator circuit, wherein the communicator circuit is arranged to communicate with a power receiver via a communication signal;
   a communication resonance circuit,
      wherein the communication resonance circuit comprises a communication antenna,
      wherein the communication antenna is arranged to transmit and receive the communication signal,
      wherein the communication resonance circuit is arranged to provide a resonance at a first resonance frequency for the communicator circuit; and
   a controller circuit,
      wherein the controller circuit is arranged to adapt the communication resonance circuit so as to not provide the resonance for the communicator circuit during the at least one object detection interval(s),
      wherein the controller circuit is arranged to adapt the communication resonance circuit so as to provide the resonance for the communicator circuit during the at least one communication interval(s).

2. The power transmitter device of claim 1, wherein the controller circuit is arranged to decouple the communication resonance circuit from the communicator circuit during the at least one object detection interval(s).

3. The power transmitter device of claim 1, wherein the controller circuit is arranged to detune the communication resonance circuit from the first resonance frequency during the at least one object detection interval(s).

4. The power transmitter device of claim 3, wherein the controller circuit is arranged to detune the communication resonance circuit to a second resonance frequency during the at least one object detection interval(s).

5. The power transmitter device of claim 4,
   wherein the second frequency is outside a frequency range,
   wherein the frequency range is from 90% to 110% of the first resonance frequency.

6. The power transfer device of claim 3, wherein the controller circuit is arranged to change a resonance capacitance of the communication resonance circuit during the at least one object detection interval(s) to during communication.

7. The power transmitter device of claim 1, wherein the first resonance frequency deviates by no more than 5% from a carrier frequency of the communication signal.

8. The power transmitter device of claim 7, further comprising an object detector,
   wherein the object detector comprises a resonance circuit,
   wherein the resonance circuit is arranged to have a resonance frequency corresponding to the first resonance frequency,
   wherein the object detector is arranged to detect a presence of an object.

9. The power transmitter device of claim 7,
   wherein the controller circuit is arranged to decouple the communication resonance circuit from the communicator circuit during the at least one object detection time interval(s),
   wherein the controller circuit is arranged to couple the communicator circuit to the object detector during the at least one object detection interval(s).

10. The power transmitter device of claim 1, further comprising a synchronizer, wherein the synchronizer is arranged to synchronize the communication resonance circuit by the controller circuit to level variations of the power transfer signal.

11. A method of operation of a power transmitter device for wireless power transfer from a power transmitter to a power receiver using an power transfer signal,
   wherein the power transfer signal during a power transfer phase uses at least one repeating frame(s),
   wherein the at least one repeating time frame(s) comprise at least one power transfer interval(s), at least one object detection interval(s) and at least one communication interval(s), wherein the power transmitter device comprises a communication resonance circuit,
wherein the communication resonance circuit comprises a communication antenna and a power transfer circuit,
wherein the communication antenna is arranged to transmit and receive a communication signal,
wherein the power transfer circuit comprises a power transfer coil, the method comprising:
generating the power transfer signal during the at least one power transfer interval(s) using the power transfer coil;
communicating with a power receiver via an communication signal;
controlling the communication resonance circuit to provide a resonance at a first resonance frequency to the communicator circuit;
adapting the communication resonance circuit so as to to not provide the resonance at the first resonance frequency to the communicator circuit during the at least one object detection interval(s); and
adapting the communication resonance circuit so as to provide the resonance at the first resonance frequency to the communicator circuit during the at least one communication interval(s).

12. A computer program stored on a non-transitory medium, wherein the computer program when executed on a processor performs the method as claimed in claim 11.

13. A power receiver device comprising:
a power transfer circuit,
wherein the power transfer circuit comprises a power transfer coil,
wherein the power transfer coil is arranged to receive a power transfer signal during at least one power transfer interval(s),
wherein the at least one power transfer interval(s) is a portion of at least one repeating frame(s),
wherein the at least one repeating frame(s) comprises the at least one power transfer interval(s), at least one object detection interval(s) and at least one communication interval(s);
a communicator circuit, wherein the communicator circuit is arranged to communicate with a power transmitter via a communication signal;
a communication resonance circuit,
wherein the communication resonance circuit comprises a communication antenna,
wherein the communication antenna is arranged to transmit and receive the communication signal,
wherein the communication resonance circuit is arranged to provide a resonance at a first resonance frequency for the communicator circuit; and
a controller circuit,
wherein the controller circuit is arranged to adapt the communication resonance circuit so as to not provide the resonance for the communicator circuit during the at least one object detection interval(s),
wherein the controller circuit is arranged to adapt the communication resonance circuit so as to provide the resonance for the communicator circuit during the at least one communication interval(s).

14. The power receiver device of claim 13, wherein the controller circuit is arranged to decouple the communication resonance circuit from the communicator circuit during the at least one object detection interval(s).

15. The power receiver device claim 13, wherein the controller circuit is arranged to detune the communication resonance circuit from the first resonance frequency during the at least one object detection interval(s).

16. The power receiver device of claim 15, wherein the controller circuit is arranged to detune the communication resonance circuit to a second resonance frequency during the at least one object detection interval(s).

17. The power receiver device of claim 16,
wherein the second frequency is outside a frequency range,
wherein the frequency range is from 90% to 110% of the first resonance frequency.

18. The power receiver device of claim 15, wherein the controller circuit is arranged to change a resonance capacitance of the communication resonance circuit during the at least one object detection interval(s) to during communication.

19. The power receiver device of claim 13, wherein the first resonance frequency deviates by no more than 5% from a carrier frequency of the communication signal.

20. The power receiver device of claim 13, further comprising a synchronizer, wherein the synchronizer is arranged to synchronize the communication resonance circuit by the controller circuit to level variations of the power transfer signal.

21. A method of operation of a power receiver device for wireless power transfer from a power transmitter to a power receiver using an power transfer signal,
wherein the power transfer signal during a power transfer phase uses at least one repeating frame(s),
wherein the at least one repeating time frame(s) comprise at least one power transfer interval(s), at least one object detection interval(s) and at least one communication interval(s),
wherein the power receiver device comprises a communication resonance circuit,
wherein the communication resonance circuit comprises a communication antenna and a power transfer circuit,
wherein the communication antenna is arranged to transmit and receive a communication signal,
wherein the power transfer circuit comprises a power transfer coil, the method comprising:
receiving the power transfer signal during the at least one power transfer interval(s) using the power transfer coil;
communicating with a power receiver via an communication signal;
controlling the communication resonance circuit to provide a resonance at a first resonance frequency to the communicator circuit;
adapting the communication resonance circuit so as to not provide the resonance at the first resonance frequency to the communicator circuit during the at least one object detection interval(s);
adapting the communication resonance circuit so as to provide the resonance at the first resonance frequency to the communicator circuit during the at least one communication interval(s).

22. A computer program stored on a non-transitory medium, wherein the computer program when executed on a processor performs the method as claimed in claim 11.

23. A computer program stored on a non-transitory medium, wherein the computer program when executed on a processor performs the method as claimed in claim 21.

* * * * *